Patented Nov. 15, 1949

2,488,489

UNITED STATES PATENT OFFICE 2,488,489

PREPARATION OF ETHERS BY REACTING TRICYCLENE WITH ALCOHOLS

Joseph N. Borglin and Richard F. B. Cox, Wilmington, Del., assignors to Hercules Powder Company, Wilmington, Del., a corporation of Delaware No Drawing. Application February 21, 1946, Serial No. 649,373

10 Claims. (Cl. 260—611)

This invention relates to the new method for preparing terpene ethers and, more particularly, to a method for preparing terpene ethers from tricyclene.

In accordance with this invention, it has been found that a terpene ether may be prepared by reacting tricyclene with an alcohol in the presence of an acid catalyst. The following examples are illustrative of the process of preparing ethers from tricyclene in accordance with this invention.

All parts and percentages are by weight unless otherwise indicated.

Example I

Twenty parts of tricyclene and 18 parts of 2-nitro-2-methylpropanol were dissolved in 30 parts of benzene and 6 parts of 85% phosphoric acid were added. The agitated reaction mixture was heated to 70° C. and held at that temperature for 20 hours, after which it was water-washed to remove the acid catalyst and then steam-sparged to remove any unreacted tricyclene. The light yellow oily residue after drying amounted to 28 parts or 75% of the theoretical yield based on tricyclene. On analysis the product was found to contain 5.28% nitrogen (theory is 5.48% nitrogen).

Example II

A mixture of 18 parts of tricyclene, 50 parts of butyl alcohol, and 1 part of 98% sulfuric acid was heated to 100° C. and agitated at that temperature for 30 hours. The reaction mixture was then poured into water and the oily layer which separated was dissolved in 50 parts of ether. The ether solution was then water-washed until free of acid and steam-sparged to remove any unreacted tricyclene and butanol. The oily residue after steam-sparging was dried. The yield of butyl terpene ether obtained, which was a dark red liquid, was 21 parts. The product was found to have a butoxyl content of 36.7% compared to the calculated per cent of butoxyl which is 35.0%.

Example III

Eighteen parts of tricyclene were dissolved in 0 parts of ethyl alcohol and 1 part of 98% sulfuric acid was added. The reaction mixture was refluxed for 24 hours and then poured into water. The oily layer which separated was taken up in ether and washed free of acid, after which it was steam-sparged to remove any unreacted tricyclene and then was dried. The ethyl terpene ether so obtained was a light yellow liquid which had an ethoxyl content of 24.9% (theory is 26.1%).

The tricyclene used in the preparation of these ethers may be obtained as a by-product in the production of camphene from isoborneol or by the isomerization of pinene. It may also be prepared by the removal of halogen from a pinene dihalide or by the reduction of tricyclenic acid. The tricyclene used for the preparation of these ethers may be either the pure compound or admixed with other terpenes.

The alcohol used in this reaction may be a monohydric alcohol such as methyl alcohol, ethyl alcohol, propyl alcohol, butyl alcohol, secondary butyl alcohol, amyl alcohol, tetrahydrofurfuryl alcohol, phenol, benzyl alcohol, etc., or it may be a substituted monohydric alcohol such as ethylene chlorohydrin, glycerin monochlorohydrin, isobutyl alcohol, nitroisobutyl glycerol, nitroisobutyl glycol, nitrobenzyl alcohols, nitrophenols, the ethers of ethylene glycol known as the "Cellosolves," the ethers of diethylene glycol known as the "Carbitols," etc. The alcohol may also be a polyhydric alcohol such as ethylene glycol, diethylene glycol, propylene glycol, glycerol, etc. Mixtures of two or more alcohols may also be used.

Any acid catalyst may be used to bring about the reaction between tricyclene and the alcohol. Suitable catalysts for the reaction are inorganic acids such as sulfuric acid and phosphoric acid; organic acids such as methyl sulfuric acid, ethyl sulfuric acid, benzene sulfonic acid, para-toluenesulfonic acid, salts of strong acids such as anhydrous zinc chloride, etc. The concentration of the catalyst used depends upon the acidic material used as a catalyst. For example, when using sulfuric acid from 1 to 2% is usually sufficient and when using phosphoric acid from 6 to 15% may be used. In general, the catalyst may be present in from about 0.1% to 50% of the total reaction mixture.

Any proportion of the alcohol to the tricyclene may be used in carrying out the reaction. However, in order to obtain high yields, at least 1 mole of the alcohol should be used for every mole of tricyclene and preferably an excess of the alcohol is used. On the other hand, an excess of tricyclene may be used, if desired. The reaction may be carried out in the absence of, or in the presence of, a solvent. Suitable solvents are the hydrocarbon solvents such as hexane, benzene, toluene, xylene, cyclohexane, etc. The reaction may be carried out at a temperature of from about 40° C. to about 150° C. Usually a temperature of about 70° C. to about 90° C. is preferable. The specific reaction temperature will depend upon the particular catalyst used, type of alcohol used, excess of alcohol, etc.

The time required to form the ether by the method in accordance with this invention varies considerably with the temperature and the catalyst used. Usually from about 4 to about 48 hours is sufficient to bring about the reaction between the alcohol and the tricyclene.

It is believed that the ethers prepared from tricyclene in accordance with the method of this invention are isobornyl ethers, produced by the addition of the alcohol to the 2:6 carbon bond. However, the mechanism of the reaction is not known, and the products produced thereby may be a mixture of terpene ethers.

The terpene ethers produced in accordance with this invention are useful as solvents in varnish and paint removers and in printing inks, as activators for insecticidal materials, in insect repellents, as rubber softeners, in soluble soaps, as lubricants for textile finishing, etc.

What we claim and desire to protect by Letters Patent is:

1. The process of preparing terpene ethers which comprises reacting tricyclene with an alcohol, which contains no olefinic unsaturation, in the presence of an acid catalyst selected from the group consisting of sulfuric acid, phosphoric acid, alkyl sulfuric acids, aromatic sulfonic acids, and salts of strong acids.

2. The process of preparing terpene ethers which comprises reacting tricyclene with a monohydric alcohol, which contains no olefinic unsaturation, in the presence of an acid catalyst selected from the group consisting of sulfuric acid, phosphoric acid, alkyl sulfuric acids, aromatic sulfonic acids, and salts of strong acids.

3. The process of preparing terpene ethers which comprises reacting tricyclene with a saturated aliphatic monohydric alcohol in the presence of an acid catalyst selected from the group consisting of sulfuric acid, phosphoric acid, alkyl sulfuric acids, aromatic sulfonic acids, and salts of strong acids.

4. The process of preparing terpene ethers which comprises reacting tricyclene with a saturated aliphatic monohydric alcohol in the presence of sulfuric acid.

5. The process of preparing terpene ethers which comprises reacting tricyclene with ethanol in the presence of sulfuric acid.

6. The process of preparing terpene ethers which comprises reacting tricyclene with a saturated aliphatic monohydric alcohol in the presence of phosphoric acid.

7. The process of preparing terpene ethers which comprises reacting tricyclene with 2-nitro-2-methylpropanol in the presence of phosphoric acid.

8. The process of preparing terpene ethers which comprises reacting tricyclene with an aromatic monohydric alcohol in the presence of an acid catalyst selected from the group consisting of sulfuric acid, phosphoric acid, alkyl sulfuric acids, aromatic sulfonic acids, and salts of strong acids.

9. The process of preparing terpene ethers which comprises reacting tricyclene with a polyhydric alcohol, which contains no olefinic unsaturation, in the presence of an acid catalyst selected from the group consisting of sulfuric acid, phosphoric acid, alkyl sulfuric acids, aromatic sulfonic acids, and salts of strong acids.

10. The process of preparing terpene ethers which comprises reacting tricyclene with an aliphatic polyhydric alcohol in the presence of an acid catalyst selected from the group consisting of sulfuric acid, phosphoric acid, alkyl sulfuric acids, aromatic sulfonic acids, and salts of strong acids, said alcohol containing no carbon to carbon unsaturation.

JOSEPH N. BORGLIN.
RICHARD F. B. COX.

REFERENCES CITED

The following references are of record in the file of this patent:

UNITED STATES PATENTS

| Number | Name | Date |
|---|---|---|
| 2,182,826 | Sheffield | Dec. 12, 1939 |
| 2,375,768 | Bruson | May 15, 1945 |
| 2,388,765 | Rummelsburg | Nov. 13, 1945 |

FOREIGN PATENTS

| Number | Country | Date |
|---|---|---|
| 5,429 | Great Britain | Dec. 31, 1907 |